United States Patent [19]
Mette

[11] 3,951,271
[45] Apr. 20, 1976

[54] ROBOT CONTROL DEVICE

[76] Inventor: Klaus-Hermann Mette, 58 Orsett St., Oakville, Ontario, Canada

[22] Filed: May 3, 1974

[21] Appl. No.: 466,828

[52] U.S. Cl. .......................... 214/1 CM; 214/1 BC; 340/347 P
[51] Int. Cl.² ........................................... B25J 1/12
[58] Field of Search ............... 214/1 B, 1 BS, 1 BB, 214/1 BT, 1 BC, 1 BH, 1 BD, 1 BV, 1 CM, 1 R, 16.4 A, 16.4 R; 340/347 P

[56] References Cited
UNITED STATES PATENTS

| | | | |
|---|---|---|---|
| 2,823,345 | 11/1958 | Ragland et al. | 318/467 |
| 2,988,237 | 6/1961 | Devol, Jr. | 214/11 |
| 2,989,680 | 6/1961 | Weiser et al. | 318/467 |
| 3,007,097 | 10/1961 | Shelley et al. | 214/1 BC X |
| 3,139,994 | 7/1964 | Chasar | 214/16.4 A |
| 3,306,471 | 2/1967 | Devol | 214/1 BC |
| 3,351,219 | 11/1967 | Ruderfer | 214/16.4 A |
| 3,402,836 | 9/1968 | Debrey et al. | 214/16.4 B |
| 3,737,056 | 6/1973 | Hathcock, Jr. | 214/16.4 A |
| 3,738,504 | 6/1973 | Vail et al. | 214/1.6 |

*Primary Examiner*—Frank E. Werner

[57] ABSTRACT

A control means for a robot transfer device in which there are provided control heads including positional sensing devices connected so as to sense the movement of the robot device in each plane, or direction, and coded signal generating means providing a direct readout giving an indication of the exact position of the workpiece at the end of the robot device. In addition, such control heads are connected to suitable electronic memory and control circuits whereby a variety of different predetermined positions can be programmed into the memory, and the various different necessary movements to be performed by the robot device can thus be carried out in sequence, and to a greater degree of accuracy, than in the past. In addition, the invention provides a simple manual programming system for programming the memory circuits with the necessary information concerning the desired predetermined positions of the device.

3 Claims, 6 Drawing Figures

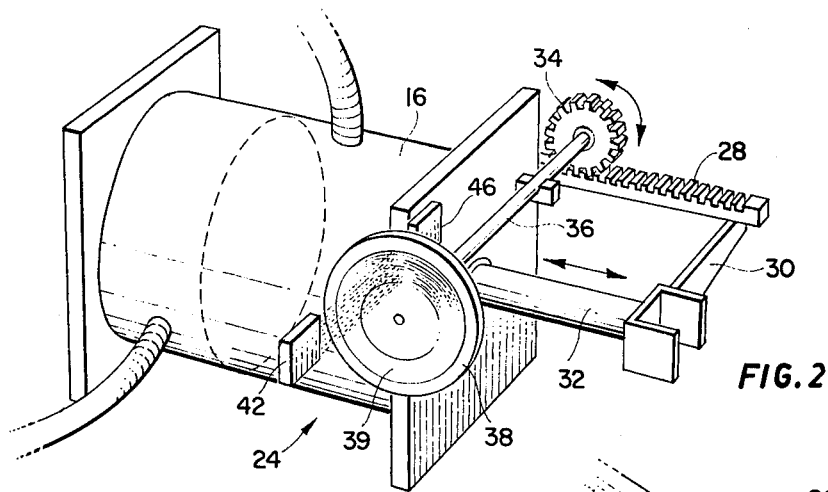
FIG. 2
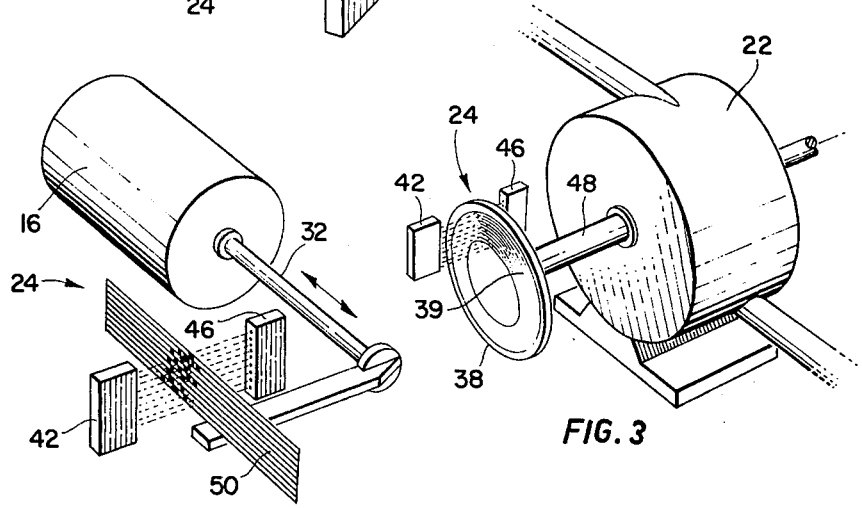
FIG. 3
FIG. 5
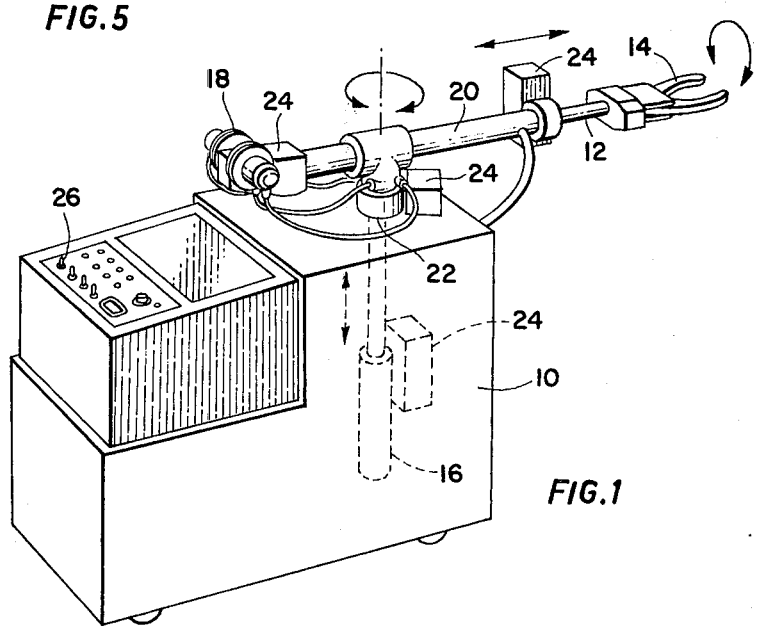
FIG. 1

3,951,271

ROBOT CONTROL DEVICE

This invention relates to a control for a robot transfer device such as is used for the automatic transfer of work pieces in an industrial manufacturing production line.

BACKGROUND OF THE INVENTION

The transferring or feeding of work pieces to various types of processing machines such as stamping machines, bending brakes, punch presses and the like, for example, by workmen involves a continual hazard to personal safety, and hand injuries are, unfortunately quite common.

To overcome this, various safety devices and protective shields have been developed for such apparatus, but they are in practice neglected by the machine operators.

Industrial safety regulations, are now becoming more specific and largely prohibit the use of such unsafe machinery. Accordingly, it is desireable to provide for some form of automatic or robotic device to simulate the hand and arm and wrist movements of a machine operator for feeding workpieces to such machines.

A variety of such robot devices have been proposed and are available. However, they suffer from various disadvantages. In particular, the programming of such robot devices usually requires a fairly sophisticated training, and is often relatively time consuming. The change over of such robot devices from one operation to another can therefore present quite a problem to management, unless a relatively large number of skilled operators are available.

It is therefore desirable to provide such robot devices with a simplified form of programming and control, which can be operated virtually by unskilled labour, or at least by labour which is no more skilled than would have performed the robot function in the first place.

In addition, such robot devices as are available on the market operate to only a relatively coarse degree of tolerance. The positional accuracy of placement of a workpiece by such a robot device is therefore somewhat imprecise, causing losses in production or variations in product quality, and in many cases jammed the press, thereby damaging the dies.

Accordingly, it is desirable therefore to increase the accuracy of and reduce the tolerances in the operation of such robot devices to the point where such wasteful results are reduced or eliminated.

In the past, the control of the operation of such robot devices has usually been effected either by means of regulation of pressure or regulation of timing of movement in any particular plane or direction, and this form of regulation has resulted in the inaccuracies referred to above, and also has in part contributed to the difficulties in programming the operation of the various functions referred to above.

BRIEF SUMMARY OF THE INVENTION

The invention therefore seeks to provide control means for a robot transfer device of the type described, but in which there are provided control heads including positional sensing devices connected so as to sense the movement of the robot device in each plane, or direction, and coded signal generating means providing a direct readout giving an indication of the exact position of the workpiece at the end of the robot device. In addition, such control heads are connected to suitable electronic memory and control circuits whereby a variety of different predetermined positions can be programmed into the memory, and the various different necessary movements to be performed by the robot device can thus be carried out in sequence, and to a greater degree of accuracy, than in the past. In addition, the invention provides a simple manual programming system for programming the memory circuits with the necessary information concerning the desired predetermined positions of the device so that a workman with little or no training can set up the device to carry out a series of predetermined functions and positional movements indefinitely, and can program in variations in such movements, or can re-program the device for a new sequence of movements with a minimum of training.

More particularly, it is an objective of the invention to provide a robot control having the foregoing advantages in which the robot device is provided with a plurality of power converters for converting power into movement of the robot arm or the like in various different planes or directions, and in which a positional sensing device is connected to sense the position of each of the power conversion devices so as to provide an indication of the position of, for example, a workpiece held in the arm of the robot device.

More particularly, it is an objective of the invention to provide a robot control having the foregoing advantages in which the positional sensing device cause the signal generating means to produce a series of coded electrical signals, giving an absolute indication of the position of the device, regardless of the position in which it is started or stopped at any given time.

It is a further and related objective of the invention to provide a robot control having the foregoing advantages which incorporate manual controls for operating the power converters so as to procure movement of the robot transfer arm in various planes and directions, and incorporating memory bank means for recording the position of such arm, and manual memory input means for recording such position on such memory bank means.

BRIEF DESCRIPTION OF THE DRAWINGS

FIG. 1 is a perspective illustration of a robot transfer device of the type to which the invention finds its application;

FIG. 2 is a schematic perspective illustration of a typical power converter for producing movement in one plane, and showing a control head attached thereto in accordance with the invention;

FIG. 3 is a schematic illustration of an alternate form of power converter showing a further form of control head attached thereto in accordance with the invention;

DESCRIPTION OF A SPECIFIC EMBODIMENT

Figure 4A:
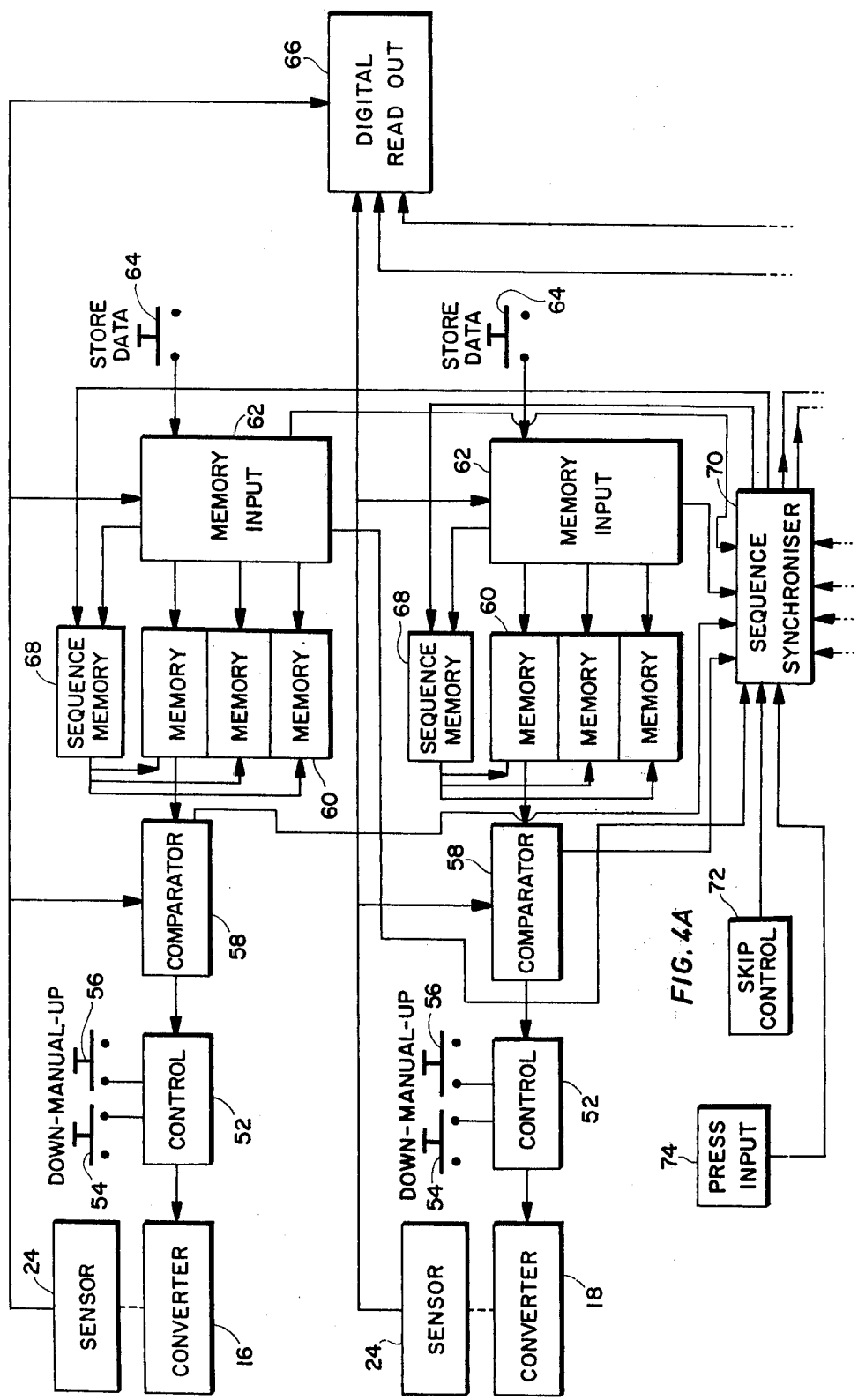
FIGS. 4A and 4B are two parts of a composite block circuit diagram of the invention, and, FIG. 5 is a schematic perspective illustration showing another typical power converter showing another form of control head in accordance with the invention.
Figure 4B:
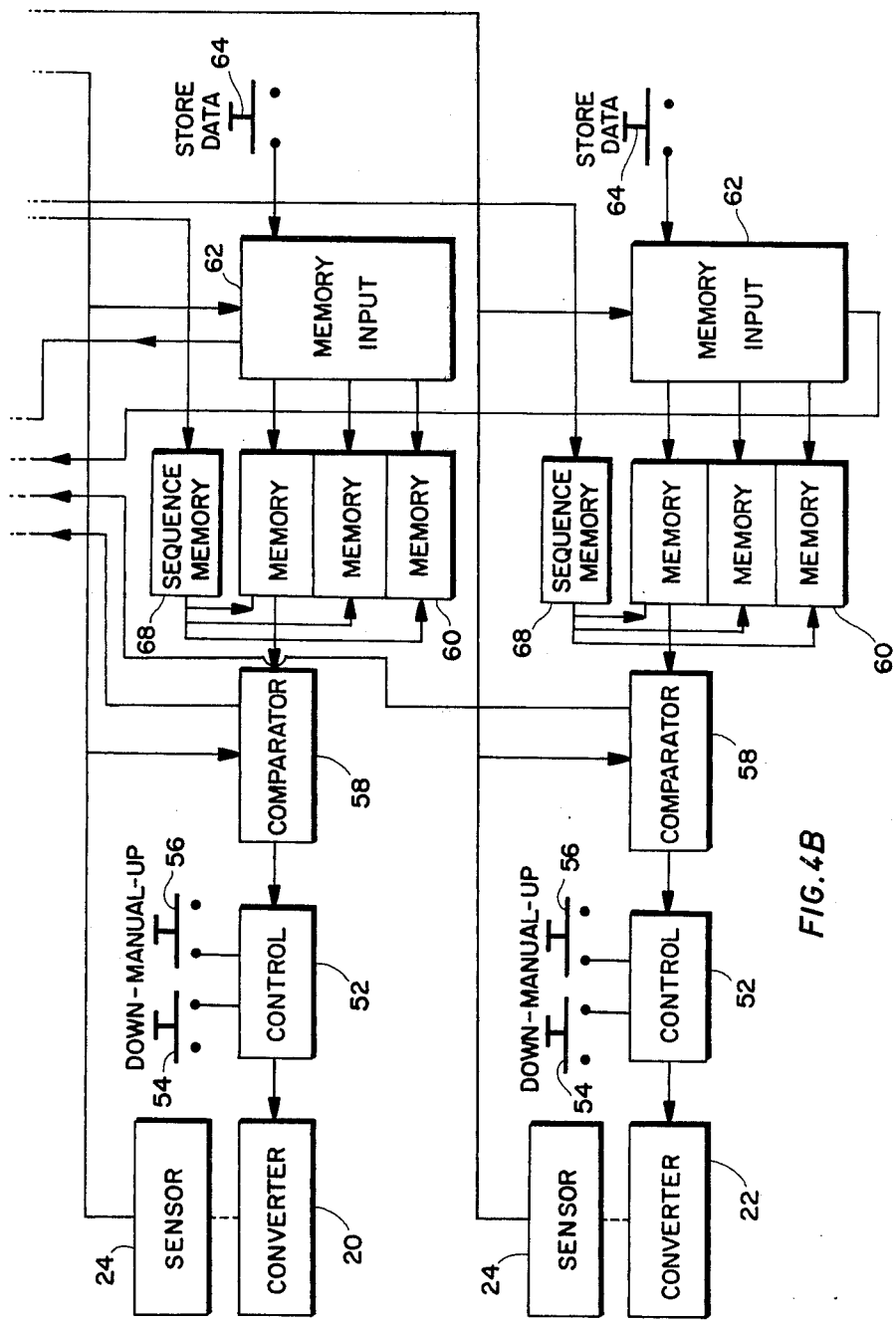

Referring now to FIG. 1 the robot device is shown there only in outline. It will of course be understood that there are a variety of such robot devices already on the market, and that the device as shown in FIG. 1 is merely intended to be representative of any such a device. Thus such a robot device will usually comprise a console 10, and a robot transfer arm 12, having at its free end some form of gripping means such as the two fingers 14.

A variety of different power converters may be provided such as for example the power cylinders 16, 18 and 20 and the torque converter 22, which may be either hydraulic or pneumatic, for moving the robot arm in various planes and directions, and rotating the fingers 14 relative to the longitudinal axis of the arm 12, and further power converters (not shown) may also be provided by providing a wrist-like action if this is necessary.

It will of course be appreciated that the invention is not restricted to any particular form of robot device or any particular combination of such different directions of movement, nor to any particular form of power converter used to achieve such movement.

Alongside each such power converter 16, 18, 20 and 22, there is provided according to the invention, a control head shown generally as 24. Such a control head will be provided for each of the power converters although it will be appreciated that its precise location, and connection to its respective power converter will depend upon the particular construction of the robot device to which it is applied, the attachment as shown in FIG. 1 being purely exemplary and not by way of limitation.

A control panel 26 is provided on the console 10 by means of which the movements of the robot arm 12 may be programmed.

With reference to FIGS. 2 and 3, the arrangement of the control heads 24 in relation to a power cylinder, and a torque converter, respectively, are illustrated.

It will be appreciated of course that in FIGS. 2 and 3 the illustrations are purely schematic and exemplary and are merely for the sake of understanding the principles of the operation of the invention, rather than being illustrative of any particular mechanical or positional arrangement.

Referring now to FIG. 2, the control head which is shown generally as 24 includes position sensing means which will be seen to comprise a toothed rack 28 mounted on a bracket 30 connected to the piston rod 32 of the cylinder C. A toothed gear wheel 34 meshes with the rack 28, and drives a shaft 36. The shaft 36 is mounted in fixed relation to the cylinder C, and carries flat disc-like mask member 38.

The control head further includes signal generating means mounted on one side of the mask 38 on a mounting member 42, namely a plurality (in this case, nine,) of photocells or photosensitive devices (not shown), and mounted on the other side of the mask member 38, a support member 46 supplying a plurality (in this case, nine,) of light beams on any suitable illumination means (not shown). The light beams are of course arranged to register with respective photocells in support member 42.

The mask member 38 may be made of any suitable material such as transparent plastic material, on which is imprinted or fastened a series of bands of opaque markings 39, known generally in the trade as a "Gray Scale Code". This scale consists in this embodiment of nine separate discontinuous bands arranged around different radii concentric with one another.

The bands provide a predetermined pattern of long and short opaque marks, interspaced with transparent portions to provide a predetermined group of coded signals either when at rest or as the mask 38 rotates.

For this purpose the markings are such as to interrupt the nine light beams in a predetermined coded sequence so as to provide a predetermined group of coded signals giving an indication of the exact position of the piston rod 32 at any position along its length of travel. Clearly, to achieve this objective, the mask 38 should not complete more than one revolution in respect of the full length of travel of the piston rod 32, since otherwise the predetermined groupings of signals would then be repeated.

A similar form of arrangement is shown in FIG. 3 for association with a torque converter shown as T. In this case, the output drive shaft 48 of the torque converter is provided with a similar mask member 38 and similar support members 42 and 46 are provided. Again, the torque converter 22 will be such that it is not required to perform more than one complete revolution of the shaft 48.

Obviously, other arrangements of photocells, light beams and masks can be arranged. For example, the mask can be incorporated on a cylindrical sleeve mounted on the mask 38 with the Gray scale inscribed around such sleeve 40. However, it is found to be more convenient to employ a disc-like mask member such as the mask 38.

Other forms of signal generating means can be provided other than photocells, although in fact photocells can readily be arranged in the required grouping, in registration with separate respective light beams to provide the required sequence of signals. If desired the light beams can be from a single light source with mirrors, prisms, etc., or transparent light-conducting rods, for respective photocells. Also gates can be arranged in front of the photocells to prevent random light striking them.

It will of course be further appreciated that it is not by any means necessary to the objects of the invention that the mask should be rotary, either in the form of a disc-like member 38 or a cylinder. The mask could equally well be in the form of a linear member, i.e. a length of flat transparent plastic material with the Gray scale inscribed or attached thereon. Thus, in the case of the piston rod 32 which moves in a linear manner, such as linear mask could be attached in the manner shown in FIG. 5, the mask being shown there as 50. Such a linear mask could equally well be applied to the torque converter T by simply making the drive shaft 48 drive a gear wheel meshing with a rack, which would then be attached to the linear mask, i.e. substantially the reverse of the arrangement shown in connection with FIG. 2. In this way, the rotary action of the shaft 48 would then be converted into a linear movement.

No matter what form the control head 24 takes however, in accordance with the invention it will provide groups of coded signals which provide a direct read out of the exact position of the power converter to which it is attached at any position along the path of movement of such power converter, whether at rest or moving.

As will be understood the Gray Scale code is used rather than the binary code, for the bands 39 and has significant advantages in providing groups of coded signals which are different at each point along the scale and therefore indicate the exact position of the mask member 38 whether at rest or in motion.

In accordance with the invention therefore the signals from such sensor are then processed in accordance with the block diagram shown in FIGS. 4a and b. The converters are shown generally as boxes 16, 18, 20, and 22, and the control heads are shown generally as the boxes 24.

The operation of the converters 16 to 22 is controlled by any suitable hydraulic or pneumatic or electrical control means appropriate to the particular type of converter. Such control means therefore is shown generally as 52. Obviously, in the case of a hydraulic power converter the control means 52 will simply be a hydraulic valve, which may be operated for example by electrical solenoid means or the like in accordance with known practises in the trade. A similar valve may be provided for a pneumatic converter. If the power converters are some form of electrical motors or the like, then such control means 52 will be in the form of suitable switches. In any case, they may be manually controlled by means of the forward and reverse buttons 54 and 56. In this way, the appropriate control 52 can be operated for any one of the converters in either direction so as to procure movement of the arm 12 as desired.

In order to procure automatic programmed operation of the appropriate controls 52, each control 52 is connected to its own comparator 58. The comparator is also connected to its respective control head 24.

A bank of memory circuits shown as 60 is provided for each comparator 58. Three such memory circuits as shown in each bank purely by way of example. It will of course be appreciated that there will be as many memory circuits in such banks 60 as are required to store information for a large number of separate movements of each power converter 16 to 22, such memory circuits being well known to persons skilled in the trade.

The memory circuits are themselves connected to a memory input circuit 62 and the memory input 62 is also connected to the control head 24.

A manual store data button 64 is provided for each memory input circuit 62, by means of which the information received in the memory input circuit 62 from its respective control head 24 may then be stored on one of the memory circuits in the memory bank 60.

A digital read out 66 may also be provided, connected to all of the control heads 24 providing separated digital read outs for the position of each of the power converters 16 to 22.

In order control the sequence in which each memory bank 60 feeds its data to the comparator, a sequence memory logic circuit 68 is provided for each memory bank 60. The sequence memory logic circuit 68 are themselves in turn controlled by a sequence synchronizer circuit 70. The sequence memory circuit 68 are also connected to the memory input circuits 62.

The sequence synchronizer 70 is also connected to the memory input circuits 62, and also to the comparators 58.

In order to permit simultaneous operation of two or more of the power converters 16 to 22, a skip control circuit 72 is provided, connected to the sequence synchronizer 70. In order to provide for continuous operation of the entire robot control circuits, the sequence synchronizer 70 is also connected to any suitable signal generating means on the press or other piece of industrial machinery. Such signal generating means is shown as the press input 74. This can of course be a micro switch, a counter, a proximity switch, photo sensitive device or the like, the details of which are unimportant to the invention.

It will of course be appreciated that the circuits shown are provided for four such power converters 16 to 22, but further such circuits will be provided if more converters are employed in any more complex form of robot transfer device.

In operation, an operator will select one of the power converters 16 to 22 which he wishes to move, and he will then press the appropriate button 54 or 56 to move that converter either in one direction or the other. When he has moved that particular converter into the position required, he will then have caused the head 24 associated with it to move in to a new position so that a predetermined group of signals has been impressed on the memory input 62. At that point the operator then presses the appropriate memory set button 64, and that information is then stored on the first open memory circuit in the memory bank 60.

The operator then selects another converter, and moves it into the next desired position by means of the buttons 54 and 56, and then stores the information from the sensor by again pressing the appropriate memory set button 64.

He will then go through this series of steps as often as is required to program a particular series of movements into the various converters 16 to 22. The information concerning all of these movements is progressively accumulated in the memory banks 60.

The operator will then put the apparatus on to continuous automatic operation by operation of an on/off control on the press (not shown).

As soon as the press has cycled once, empty, the press input will then trigger the sequence synchronizer 70 which then generates clock pulses corresponding to each manual programming step. The clock pulses trigger respective sequence memory controls 68 to connect the appropriate memory 60 of each memory bank to its respective comparator 58. The information then stored on the memory banks 60 will be sequentially communicated to the respective comparators 58 for the various converters 16 to 22. In each case, as soon as a particular memory unit from a memory bank 60 has been connected with its comparator 58, the comparator 58 will then compare the information from that memory unit with the information supplied to it from the head 24 and will deliver an appropriate forward or reverse control signal to the appropriate control 52. The control 52 will then cause movement of its respective converter in either a forward or reverse direction. Such forward or reverse movement will of course procure the comparable movement of its head 24 which will then be communicated back to the comparator 58. As soon as the sensor signals and the memory unit signals received in the comparator match, the comparator will shut down the control 52 and the operation of its appropriate converter will cease.

The comparator then signals the sequence synchronizer 70 that the particular command has been executed and the synchronizer then delivers another clock pulse and so on.

These operations will continue continuously in sequence at a very high degree of accuracy so long as the press automatic control is left on and the press is running.

If at any time the device requires to be re-programmed, then the operator simply stops the device at any position, and then takes over with the manual forward and reverse controls 54 and 56 to move it to a new position at which point the new sensor information can be stored in the memory as before, such storing automatically erasing the previous information stored thereon.

What I claim is:

1. An article transfer device of the type providing for automatic repetitive transfer of articles along a path from one position to another, said device comprising;

article transfer means;

power operated drive means for moving said article transfer means at least between one position and another along said path;

operator control means for selectively manually controlling said drive means or placing the same under automatic control;

signal generating sensing means connected with said article transfer means for sensing movement thereof, when said article transfer means is driven by said power operated means and operable to deliver coded signals in predetermined different combinations each said different combination of coded signals indicating a predetermined different position of said article transfer means, said sensing means having a plurality of light activated signal generating devices located at spaced intervals, and mask means therefore, said mask means having a plurality of mask areas arranged to register with respective said signal generating devices, and light source means for said devices, said mask means and said signal generating devices being mounted for movement relative to one another, in response to movement of said article transfer means;

electronic memory bank means for receiving and storing said coded signal combinations from said signal generating means when said transfer means has been manually driven into selected positions;

comparator means connected with said memory bank means and said signal generating means and operable during automatic operation for comparing the signals received from said signal generating means with a selected one of said stored coded signal combinations, and operable to deliver a control signal to said power operated drive means responsive to matching of a said received signal and a said stored coded signal combination, thereby causing same to drive said transfer means from one position to another automatically without operation of the manual control means, and, sequence memory bank means connected to said signal generating sensing means and recording the sequence in which coded signals corresponding to selected positions as aforesaid are generated, and are stored in said memory bank means, and operable during automatic operation to select successive said stored coded signal combinations from said memory bank means for comparison by said comparator means, one after the other to procure automatic movement of said transfer means from one said position to another.

2. In an article transfer device, a control means as claimed in claim 1 including manually operable means connected to said memory circuit means for procuring storage of data for any selected position of said article transfer means.

3. An article transfer device, as claimed in claim 2 having a plurality of said power operated drive means, and including signal generating sensing means for each said power operated drive means and sequence synchroniser means connected with said sequence memory bank means.

* * * * *